United States Patent [19]
Suzuki et al.

[11] Patent Number: 5,741,058
[45] Date of Patent: Apr. 21, 1998

[54] LED DISPLAY DEVICE

[75] Inventors: Akihiko Suzuki, Kagamigahara; Makoto Tamaki, Iwakura; Takemasa Yasukawa, Ichinomiya; Osamu Yamanaka, Aichi-ken; Tadanobu Iwasa, Ichinomiya, all of Japan

[73] Assignee: Toyoda Gosei Co., Ltd., Aichi, Japan

[21] Appl. No.: 688,837

[22] Filed: Jul. 31, 1996

[30] Foreign Application Priority Data

| Jul. 31, 1995 | [JP] | Japan | 7-195615 |
| Jul. 31, 1995 | [JP] | Japan | 7-195617 |
| Aug. 1, 1995 | [JP] | Japan | 7-196820 |
| Mar. 25, 1996 | [JP] | Japan | 8-068017 |

[51] Int. Cl.$^6$ .................................. G01D 11/28
[52] U.S. Cl. ............... 362/27; 362/23; 362/30; 362/31; 362/800
[58] Field of Search ................. 362/23, 26, 27, 362/29, 30, 31, 800, 234, 231

[56] References Cited

U.S. PATENT DOCUMENTS

| 5,084,698 | 1/1992 | Sell | 340/701 |
| 5,227,767 | 7/1993 | Tanaka | 345/151 |
| 5,257,167 | 10/1993 | Clem | 362/27 |
| 5,276,591 | 1/1994 | Hegarty | 362/31 |
| 5,556,187 | 9/1996 | Furuya et al. | 362/27 |

FOREIGN PATENT DOCUMENTS

| 616922 | 9/1994 | European Pat. Off. |
| 1293269 | 10/1972 | United Kingdom |

*Primary Examiner*—Stephen F. Husar
*Attorney, Agent, or Firm*—Cushman, Darby & Cushman IP Group of Pillsbury, Madison & Sutro LLP

[57] ABSTRACT

An LED display device having an LED array for a meter on a printed circuit board. A diffusing radiation lens array is disposed facing the LED array. A cover lens is overlapped on the lens array. The cover lens transmits LED light which passed through the lens array. The cover lens has at least a scale mark, a character and a sign. A sheet is interposed between the lens array and the cover lens. The sheet limits radiation of predetermined diffused light from the lens array while partially transmitting the diffused light. The cover lens has a scale mark dent and a character dent formed on its rear interior surface, and displays the scale mark and character by means of an LED light from another LED array.

23 Claims, 11 Drawing Sheets

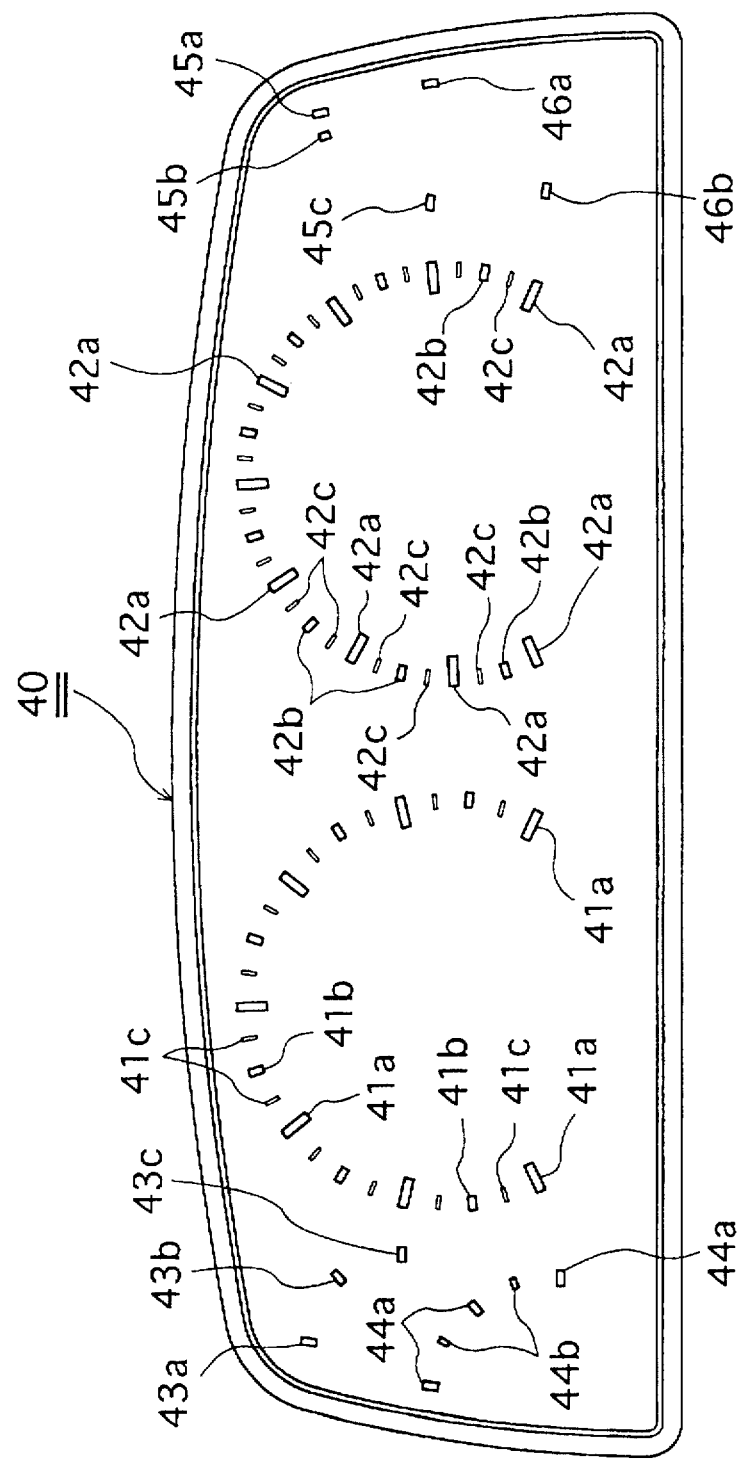

LED DISPLAY DEVICE

BACKGROUND OF THE INVENTION

1. Field of the Invention

This invention relates to an LED display device which includes a plurality of LEDs and which is adapted to be applied to a meter, such as a speed meter or a tachometer for cars. This invention is particularly directed to a vehicle meter having elements, such as a scale, pointer and dial.

2. Description of the Related Art

Commonly, a magnetic type speed meter is used for a conventional speed meter used in a vehicle. This speed meter comprises a dial, pointer and drive unit for displaying speed by rotating the pointer. This speed meter displays speed in miles per hour or kilometers per hour on the scale of the dial using the pointer.

On the other hand, a vehicle meter, such as a speed meter, serves as part of the vehicle's interior in addition to conveying information about speed and so on. A vehicle meter occupies a main part of an instrument panel which attracts the drivers' attention the most, and therefore, its design is important. For this reason, many attempts have been made to provide meters of a type and disposition that caters to diversified tastes and sensitivities of present day users.

However, due to the complicated machinery and wearing of used mechanical parts, the design of a conventional instrument panel is fined at the time manufactured, and it can not be changed according to the tastes of users. Moreover, a conventional design, including a dial and a pointer, can not correspond to various tastes of users and it needs improvement.

Furthermore, a conventional vehicle meter can not be a thin type. Therefore, the interval between the vehicle meter and eyes of the users can not be large, and the conventional meter also needs improvement in its visibility while taking farsightedness of middle and old aged people into consideration.

Particularly, conventional meters have the pointer rotate over the dial, so that the pointer inevitably overlaps a numeral on a scale. Thus, the numeral is hard to be read. Then, a driver who is unfamiliar with a car on which the conventional meter is mounted, must look at numerals near the overlapped numeral to guess which numeral is hidden instead of directly reading the meter.

SUMMARY OF THE INVENTION

The present invention is provided to improve upon display devices particularly used in vehicles, such as vehicle meters. In order to achieve this end, one or more aspects of the invention may be followed in order to bring about one or more specific objects and advantages, such as those noted below.

A first object of the invention is to provide an improved LED display device which can have peculiar design effect and which can be formed as a thin type display device, thereby enlarging an interval between the display and the eyes of the user.

A second object of the invention is to provide a display device which can have peculiar design effects and which can reduce tiredness of users' eyes.

A third object of the invention is to provide a display device which can have peculiar design effect and which can improve the picture quality.

An LED display device is provided according to one aspect of the invention. A printed circuit board is provided, and a first LED array includes a plurality of LEDs which are disposed on the printed circuit board at a position corresponding to the display area. A lens array includes a plurality of lens elements. Each of the lens elements has an incident surface facing at least one of the plurality of LEDs in the first LED array and a radiant surface diffusing incident light entering the incident surface so as to radiate the light toward the front side of the display device. A cover lens is disposed on the lens array at the front side of the display device. The cover lens has an end. A second LED array includes a plurality of LEDs disposed on the printed circuit board such that the second LED array radiates light into the end of the cover lens. The cover lens transmits incident light from the plurality of LEDs of the second LED array from the end of the cover lens generally toward the lens array at the front side of the display device.

An LED display device is provided according to one aspect of the invention. A printed circuit board is provided, and an illuminating LED array includes a plurality of LEDs disposed on the printed circuit board. A cover lens of a transparent material has an end facing the illuminating LED array, a front surface facing the front side of the display device and a rear surface facing the rear side of the display device. The cover lens transmits light of the illuminating LED array from the end. The cover lens has at least one of a scale mark, a character and a sign defined by a hollow located at the rear surface of the cover lens such that at least one of the scale mark, character and sign is displayed by the illuminating LED array.

BRIEF DESCRIPTION OF THE DRAWINGS

FIG. 10 is a front view of a cover lens used in the LED display device in the embodiment of the invention;

DETAILED DESCRIPTION OF PREFERRED EMBODIMENTS

FIGS. 1 to 10 respectively show components of a vehicle meter as one embodiment of an LED display device of the invention.

Figure 1:
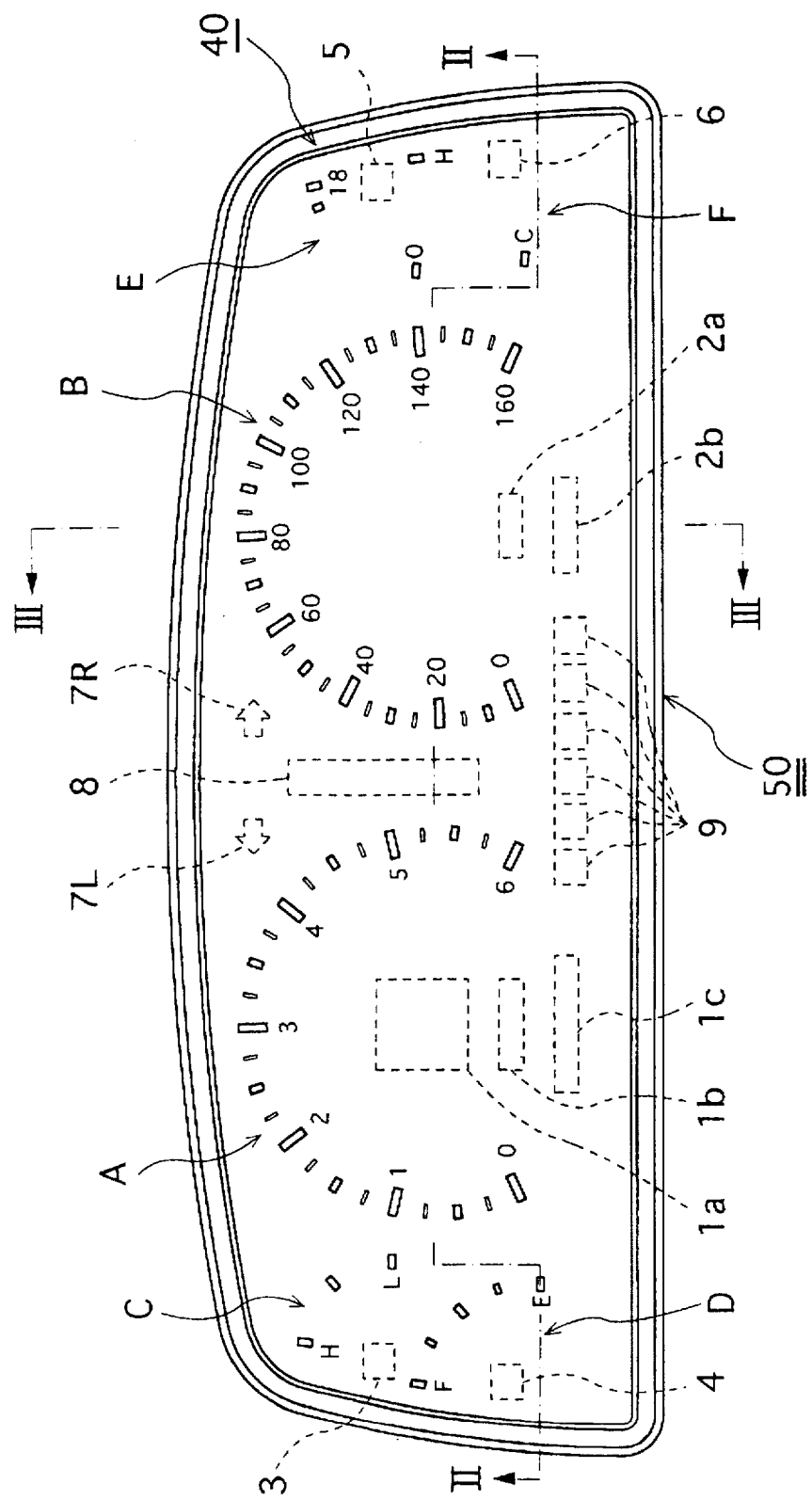
FIG. 1 is a front view of an LED display device in one embodiment of the invention.
Figure 2:
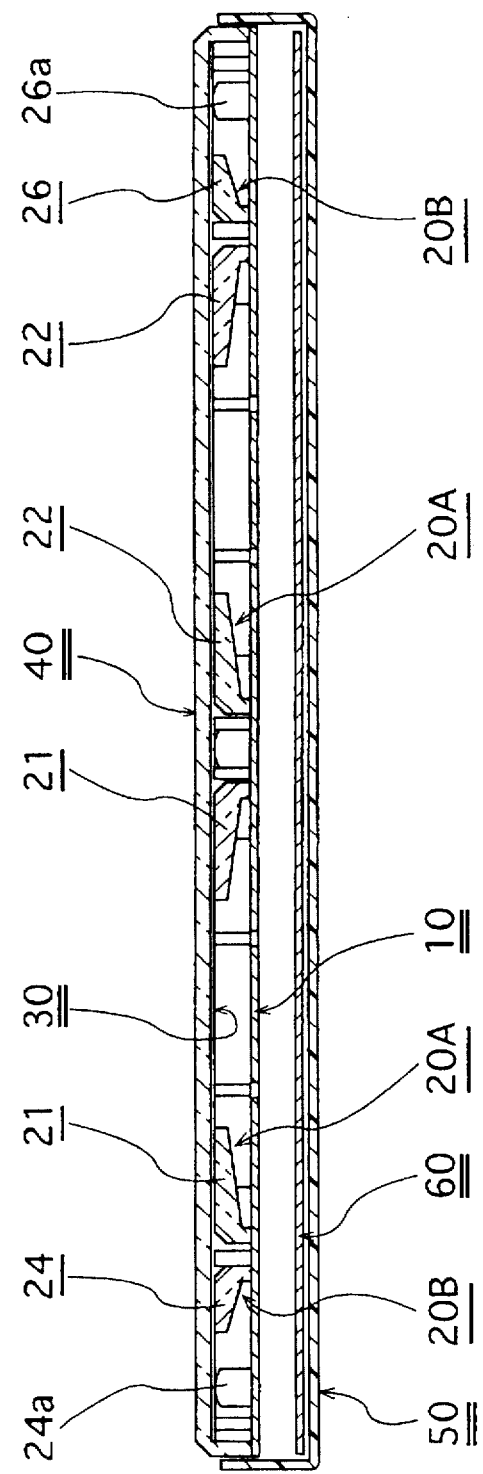
FIG. 2 is a sectional view taken along the line II—II in FIG. 1.
Figure 3:
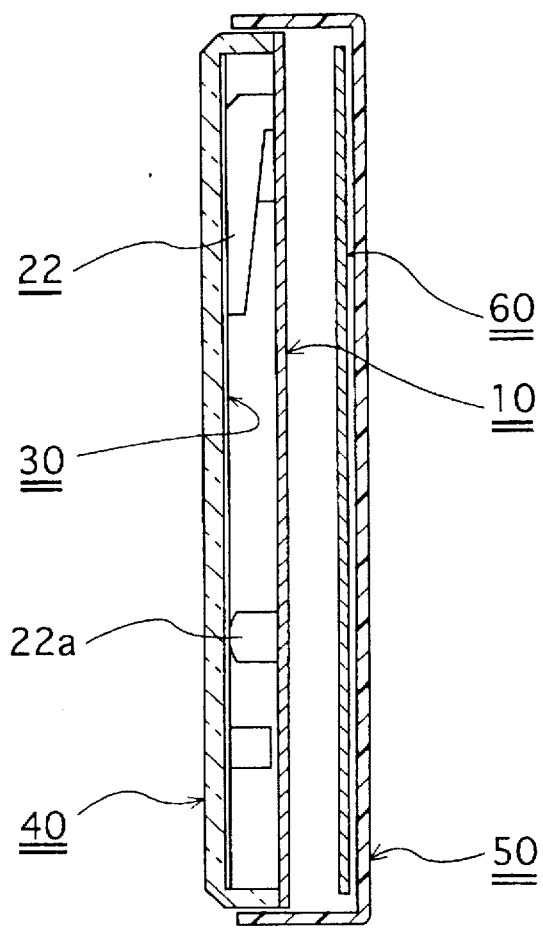
FIG. 3 is a sectional view taken along the line III—III in FIG. 1.

Referring to FIGS. 1 to 3, this embodiment of an LED display device is provided in a vehicle meter panel. The meter panel contains a variety of indicators: tachometer A, speedometer B, oil pressure gauge C, fuel gauge D, voltmeter E and coolant temperature gauge F. Function display portions 1a, 1b, 2a, 3, 4, 5 and 6 are arranged, corresponding to the indicators A, B, C, D and E, for showing their functions, respectively. Display portions 1c and 2b are arranged, corresponding to the indicators A and B, for showing predetermined contents such as their display details or the like, respectively. The meter panel has turn indicator portions 7R and 7L, a function display portion 8 and a warning display portion 9 disposed at its center.

A housing 50 of the meter panel accommodates therein the indicators, such as the tachometer A and speedometer B and so on, thereby defining a frame for them. If there is assembled only one indicator or meter, the housing 50 may be structured so as to be able to accommodate one meter. If there are a plurality of indicators or meters, the housing 50 may be structured so as to be able to accommodate those meters. The LED display device of this embodiment can be provided in devices which require a predetermined light emission display, other than the illustrated vehicle meter panel. In this case, the structure of the housing 50 may be varied accordingly.

A printed circuit board 60 is disposed in the interior of the housing 50. Though not shown, the printed circuit board 60 is mounted with a drive circuit for operating a fixed number of LEDs, an A-D conversion circuit for converting input analog signals into digital signals, a code conversion circuit for lighting the LEDs in a predetermined number, etc. The printed circuit board 60 is mounted with circuits and electronic parts which themselves generate heat. Accordingly, the printed circuit board 60 is constructed so as to release the radiated heat from those parts toward the side of printed circuit board 60 facing away from the exposed surface of the meter (lower side in FIG. 2) of the housing 50. Therefore, this embodiment prevents the heat from the printed circuit board 60 from escaping to the front side (upper side in FIG. 2) of the meter panel. Thus, such heat never becomes a heating source for a printed circuit board 10 which is mounted with LEDs 11-16 described later. Accordingly, it is possible to minimize the thermal influence on the printed circuit board 10.

The printed circuit board 10 is disposed above the printed circuit board 60 inside the housing and maintained at a fixed minimum distance from the printed circuit board 60. The printed circuit board 10 is mounted with a plurality of LEDs corresponding to diffuse radiation lens, which are composed of diffuse radiation lens elements 20A or diffuse radiation lens elements 20B.

Figure 4:
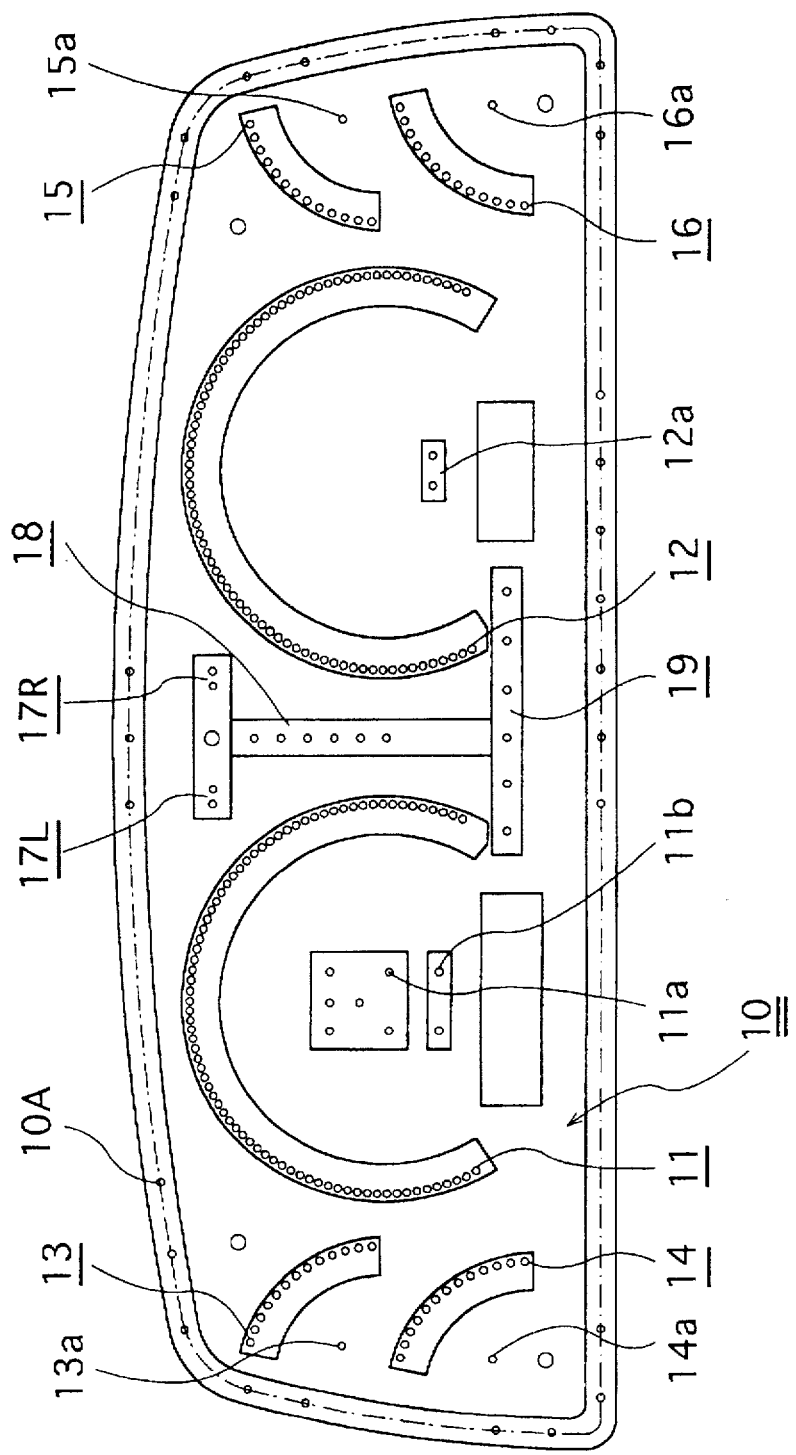
FIG. 4 is a front view showing the disposition of the LEDs on a printed circuit board in the LED display device in the embodiment of the invention.

FIG. 4 shows a positional arrangement of the LEDs used in this embodiment of the LED display device.

As shown in FIG. 4, the LEDs are composed of LED arrays 11, 12, 13, 14, 15 and 16 for the indicators or meters, and LEDs 11a, 11b, 12a, 13a, 14a, 15a and 16a for the function display portions. The LED array 11 is made of many LEDs, which are arranged in a sector shape of substantially 270 degrees, for the tachometer A. The LEDs 11a and 11b are provided for illuminating the function display portions 1a and 1b, respectively. The LED array 12 is made of many LEDs, which are arranged in a sector shape of substantially 270 degrees, for the speedometer B. The LEDs 12a are provided for illuminating the function display portion 2a. The LED array 13 is made of many LEDs, which are arranged in a sector shape of substantially 90 degrees, for the oil pressure gauge C. The LED 13a is provided for illuminating the function display portion 3. The LED array 14 is made of many LEDs, which are arranged in a sector shape of substantially 90 degrees, for the fuel gauge D. The LED 14a is provided for illuminating the function display portion 4. The LED array 15 is made of many LEDs, which are arranged in a sector shape of substantially 90 degrees, for the voltmeter E. The LED 15a is provided for illuminating the function display portion 5. The LED array 16 is made of many LEDs, which are arranged in a sector shape of substantially 90 degrees, for the temperature gauge F. The LED 16a is provided for illuminating the function display portion 6.

Each of the LEDs of the LED arrays is disposed for each display device, thereby defining the resolution of each indicator A-E. LED array 10A has a predetermined number of LEDs for emitting light into a cover lens 40 made of a transparent material to illuminate lens 40. The LED array 10A is arranged around the LED arrays 11-16 for the indicators so as to provide a desired brightness along its whole circumference. The LED array 10A does not illuminate the cover lens 40 itself, but scales, characters, signs, marks or the like which are engraved on the cover lens 40. Therefore, the position and number of the LEDs of the lens array 10A are determined according to the scales, characters, signs, marks or the like to be illuminated.

LEDs 17R and 17L are disposed, at the upper part of the meter panel between the LED arrays 11 and 12, for illuminating the turn indicator portions 7R and 7L. LEDs 18 and 19 are disposed, at the central part and lower part of the meter panel between the LED arrays 11 and 12, for illuminating the function display portion 8 and the warning portion 9.

The printed circuit board 10 is a multilayer printed circuit board. The LED arrays 11-16 and the LED array 10A are disposed so as not to protrude from an upper surface of the printed circuit board. The upper surface of the printed circuit board 10 has a mat black color so as not to reflect extraneous light.

Figure 5:
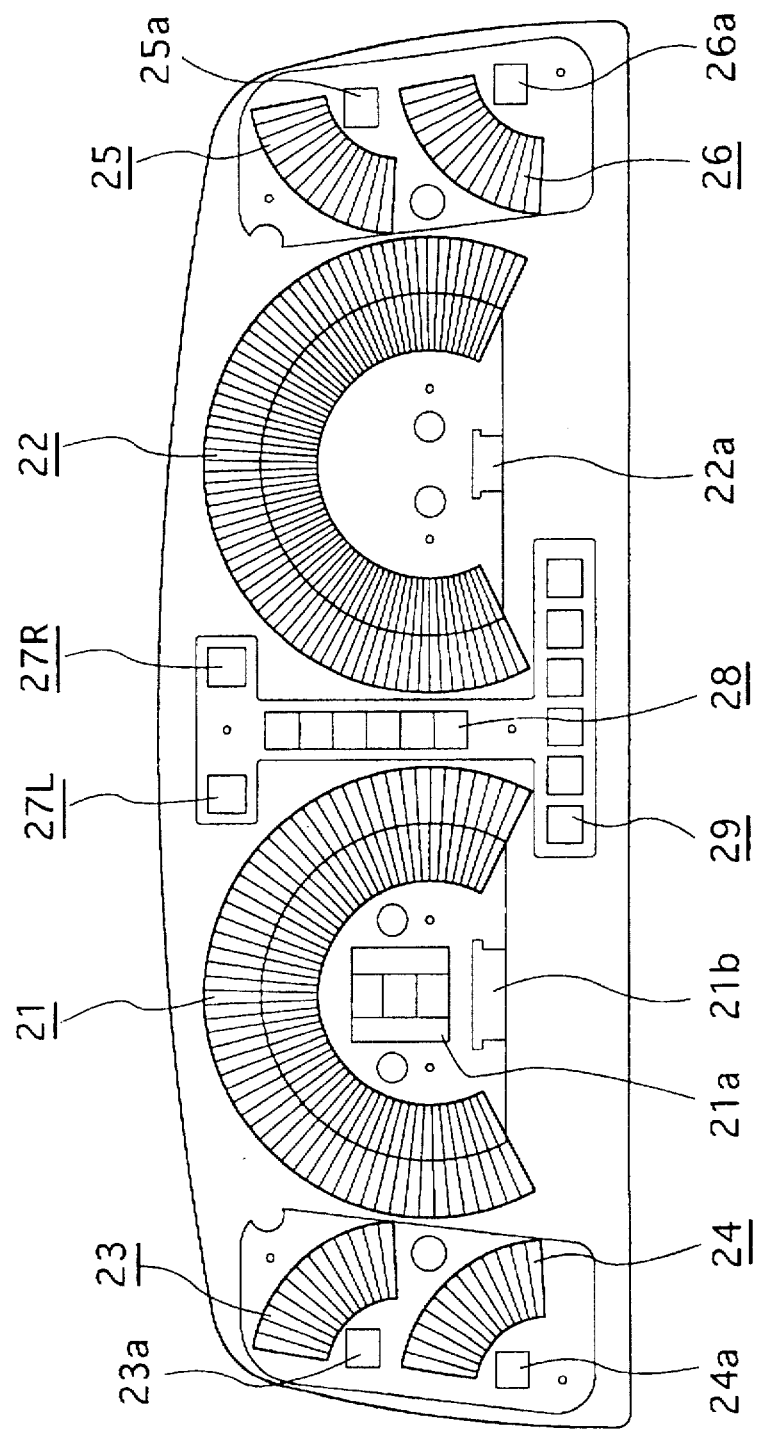
FIG. 5 is a front view showing disposition of diffuse radiation lenses in the LED display device in the embodiment of the invention.

FIG. 5 shows a positional arrangement of the lenses used in this embodiment of LED display device.

Plural diffuse radiation lens elements 20A (see FIGS. 6a and 6b) and plural diffuse radiation lens elements 20B (see FIGS. 7a and 7b) are disposed corresponding to the LED arrays 11-16 and the LED array 10A. Namely, as shown in FIG. 5, a diffuse radiation lens array 21 is disposed corresponding to the LED array 11. A diffuse radiation lens array 22 is disposed corresponding to the LED array 12. A diffuse radiation lens array 23 is disposed corresponding to the LED array 13. A diffuse radiation lens array 24 is disposed corresponding to the LED array 14. A diffuse radiation lens array 25 is disposed corresponding to the LED array 15. A diffuse radiation lens array 26 is disposed corresponding to the LED array 16.

Each diffuse radiation lens array 21 and 22 is formed of the diffuse radiation lens elements 20A. Each diffuse radiation lens array 23, 24, 25 and 26 is formed of the diffuse radiation lens elements 20B, which is shorter than the lens element 20A. One lens element 20A, 20B is provided for each LED. Thus, each lens element 20A, 20B defines the resolution of each indicator A-F.

Figure 6A:
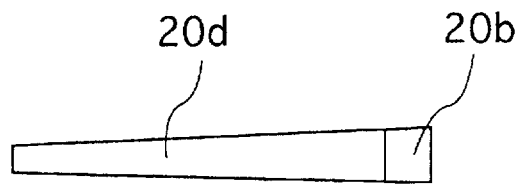
FIG. 6a is a plan view showing a first diffusion radiation lens element in the LED display device in the embodiment of the invention.
Figure 6B:
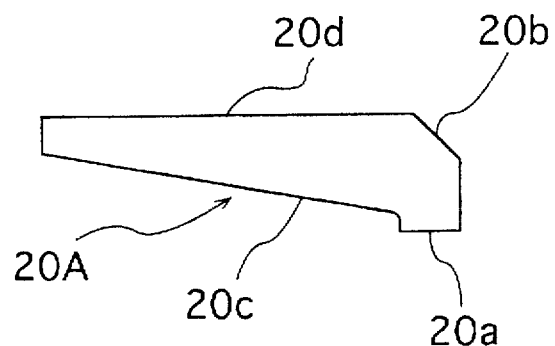
FIG. 6b is a front view showing the first diffusion radiation lens element in the LED display device in the embodiment of the invention.

As shown in FIGS. 6a and 6b, the lens element 20A has an incident side 20a, a first reflection surface 20b, a second reflection surface 20c and an emitting side 20d. The incident side 20a is positioned opposite to the LED so that the first reflection surface 20b reflects the incident light from the LED which goes upward in FIG. 6b. The reflected light from the first reflection surface 20b is again reflected upward by the second reflection surface 20c. The light is also diffused by the first and second reflection surfaces 20b and 20c, and such diffused light is radiated outside (upward in FIG. 6b) from the emitting side 20d. The incident side 20a is made into a flat smooth surface. The first reflection surface 20b has a total reflection surface which reflects the incident light at an angle of substantially 45 degrees. The second reflection surface 20c has a total reflection surface which reflects the incident light at an angle of substantially 30–45 degrees. The second reflection surface 20c is made into a roughened surface. The emitting side 20d is made into a flat smooth surface.

Figure 7A:
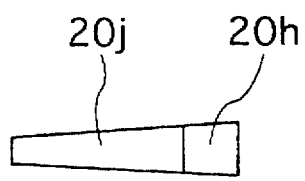
FIG. 7a is a plan view showing a second diffusion radiation lens element in the LED display device in the embodiment of the invention.
Figure 7B:
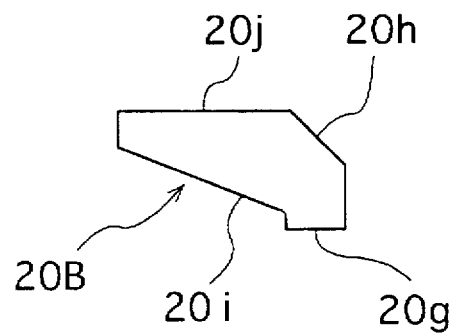
FIG. 7b is a front view showing the second diffusion radiation lens element in the LED display device in the embodiment of the invention.

As shown in FIGS. 7a and 7b, the lens element 20B has an incident side 20g, a first reflection surface 20h, a second reflection surface 20i and an emitting side 20j. The incident side 20g is positioned opposite to the LED so that the first reflection surface 20h reflects the incident light from the LED which goes upward in FIG. 7b. The reflected light from the first reflection surface 20h is again reflected upward by the second reflection surface 20i. The light is also diffused by the first and second reflection surfaces 20h and 20i, and such diffused light is radiated outside (upward in FIG. 7b) from the emitting side 20j. The incident side 20g is made into a flat smooth surface. The first reflection surface 20h has a total reflection surface which reflects the incident light at an angle of substantially 45 degrees. The second reflection surface 20i has a total reflection surface which reflects the incident light at an angle of substantially 30–45 degrees. The second reflection surface 20i is made into a roughened surface. The emitting side 20j is made into a flat smooth surface.

The lens elements 20A, 20B have their surfaces, except the incident side 20a, 20g and the emitting side 20d, 20j, coated with a metal by sputtering or a white paint, thereby heightening the reflectance of the light and preventing leakage of the light. The emitting side 20d, 20j has a larger area than an area of the incident side 20a, 20g. When the lens elements 20A, 20B are arranged in a fixed sector plan shape to form the lens arrays 21–26, each is placed so as to position the incident side 20a, 20g at the outer circumference. Therefore, the emitting side 20d, 20j makes its one end (left end in FIGS. 6a and 7a), opposite to the incident side 20a, 20g, narrower than the other end (right end in FIGS. 6a and 7a), at the incident side 20a, 20g. Thus, it is possible to keep the clearances large between the LEDs of the LED arrays 11–16, which are disposed on the printed circuit board 10, so that the LEDs may accordingly be easily mounted.

Referring to, e.g., FIGS. 4 and 5, a condenser lens 21a is disposed opposite to the LED 11a. A condenser lens 21b is disposed opposite to the LED 11b. A condenser lens 22a is disposed opposite to the LED 12a. A condenser lens 23a is disposed opposite to the LED 13a. A condenser lens 24a is disposed opposite to the LED 14a. A condenser lens 25a is disposed opposite to the LED 15a. A condenser lens 26a is disposed opposite to the LED 16a.

Condenser lenses 27R and 27L are disposed opposite to the LEDs 17R and 17L, respectively. Condenser lenses 28 and 29 are disposed opposite to the LEDs 18 and 19, respectively.

Each of the condenser lenses 21a, 21b, 22a, 23a, 24a, 25a, 26a, 27a, 27R, 27L, 28, and 29 is composed of a lens of a photoconductor material with a convex leading end (see FIGS. 2 and 3). Particularly, the condenser lenses 28 and 29 are continuously formed in one body while each is composed of a lens of a photoconductor material with a convex leading end corresponding to the function display portion 8 (see FIG. 1) and each warning item of the warning display portion 9 (see FIG. 1).

Figure 8:
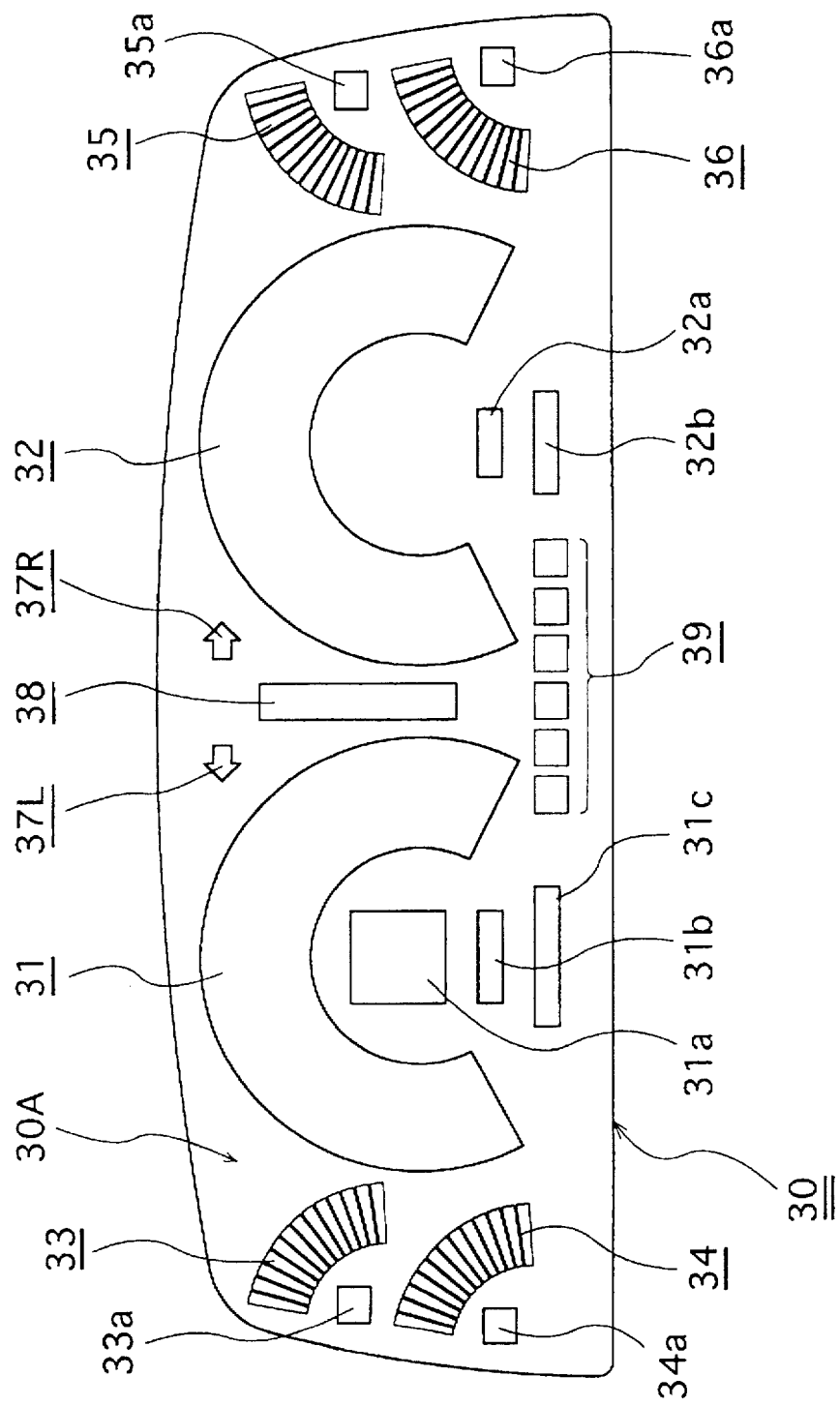
FIG. 8 is a front view of a sheet used in the LED display device in the embodiment of the invention.

FIG. 8 shows an example of a sheet 30 used in this embodiment of the LED display device.

A sheet 30 is disposed over the upper side of the lens arrays 21–26 so as to regulate the radiation of a predetermined diffused light from the lens arrays 21–26 while partially transmitting the diffused light. The sheet 30 is made of a transparent material.

Specifically, the sheet 30 is made of a PC (polycarbonate) sheet 0.5 mm in thickness, on which a grain pattern is formed. The sheet 30 has a printed portion 30A which serves as a mask to limit the radiation of the diffused light from the lens arrays 21–26. The printed portion 30A is formed using a printing ink, eliminating the transparency of the transparent sheet 30. The front surface (upper surface in FIGS. 2 and 3) of the printed portion 30A is printed with characters, illustrations or the like which are used in an LED display device of a specific use. The opaque printed portion 30A masks the meter panel to hide the inside thereof which should not be seen. In this embodiment, the portion 30A is provided with a print that is common in the vehicle meter panel.

The sheet 30 has a plurality of transparent portions which transmit the diffused light from the LED arrays 21–26. Namely, the transparent portion 31 is placed on the upper surface of the lens array 21. The transparent portions 31a and 31b are placed on the upper surfaces of the condenser lenses 21a and 21b, respectively. The transparent portion 32 is placed on the upper surface of the lens array 22. The transparent portion 32a is placed on the upper surface of the condenser lens 22a. The transparent portion 33 is placed on the upper surface of the lens array 23. The transparent portion 33a is placed on the upper surface of the condenser lens 23a. The transparent portion 34 is placed on the upper surface of the lens array 24. The transparent portion 34a is placed on the upper surface of the condenser lens 24a. The transparent portion 35 is placed on the upper surface of the lens array 25. The transparent portion 35a is placed on the upper surface of the condenser lens 25a. The transparent portion 36 is placed on the upper surface of the lens array 26. The transparent portion 36a is placed on the upper surface of the condenser lens 26.

Moreover, the transparent portions 37R and 37L are positioned on the upper surfaces of the condenser lenses 27R and 27L, respectively. The transparent portions 38 and 39 are placed on the upper surfaces of the condenser lenses 28 and 29, respectively.

The transparent portions 31a, 31b, 32a, 33a, 34a, 35a and 36a are printed with information representing the functions of the corresponding function display portions 1a, 1b, 2a, 3, 4, 5 and 6, respectively. The transparent portion 38 is printed with information representing the function of the function display portion 8. The transparent portion 39 is printed so as to convey the warnings of the warning display portion 9. Then, when the LEDs 11a, 11b, 12a, 13a, 14a, 15a, 18 and 19 are lit, the printed information of the corresponding function display portions 1a, 1b, 2a, 3, 4, 5, 6 and 8 or warning display portion 9 are shown by illumination through the lenses 21a, 21b, 22a, 23a, 24a, 25a, 26a, 28 and 29. When the LEDs 17R and 17L are flashed, the turn indicator portions 7 and 8 are displayed by flashing through the lenses 27R and 27L.

Particularly, in the sheet 30 of this embodiment, each of the transparent portion 31 for the tachometer A and the transparent portion 32 for the speedometer B is made of a through hole of the same sector plan shape as the lens array 21, 22. Accordingly, a change of a variable is indicated by the change of the illuminated area of the lens array 21 and lens array 22. Of course, one of the lens elements 20A of the lens arrays 21 and 22 may be lit at an angular position corresponding to the present variable. In this case, it is possible to give a similar display feeling to that of a common meter that uses a pointer. Moreover, the portions of the sheet 30 other than the transparent portions 31–36, 37R, 37L, 38 and 39 have no transparency. Thus, such portions block the light that leaks around from the LED arrays 11–16 for the meters, LED array 10A for illumination, LEDs 17R, 17L, 18 and 19, lens arrays 21–26 and condenser lenses 21a, 21b, 22a, 23a, 24a, 25a, 26a, 27R, 27L, 28, 29, etc. Therefore, contrast at the displaying part can be emphasized. Furthermore, if such light shielding portions are expanded, it is possible to eliminate blur of the display outline that is generated by intrusion of light as an external factor.

Figure 9:
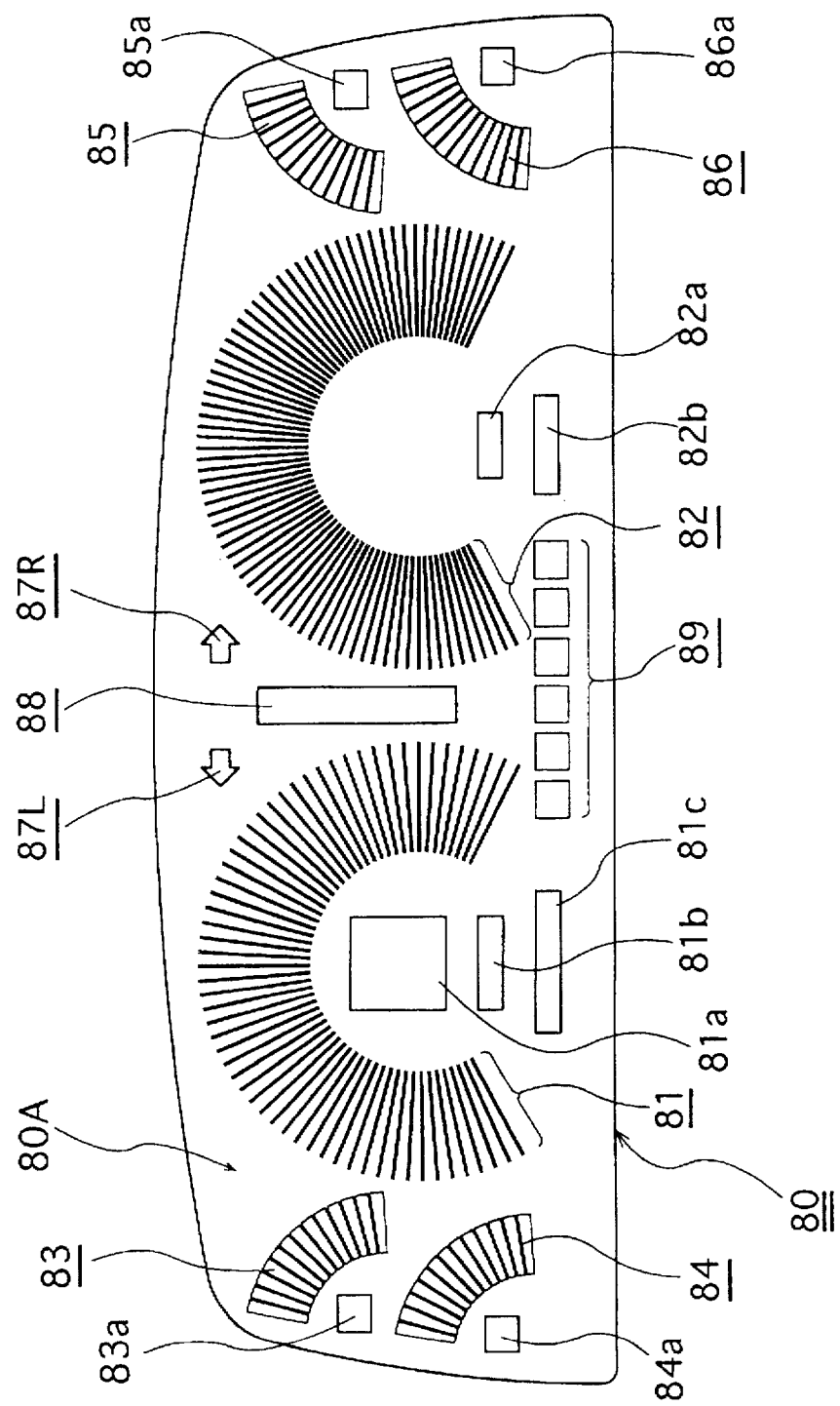
FIG. 9 is a front view showing another sheet which can be used in the LED display device in the embodiment of the invention.

FIG. 9 shows a modified sheet 80 that is applicable to this embodiment of the LED display device.

Referring to FIG. 9, the sheet 80 has a structure similar to the sheet 30 of FIG. 8 in that it uses the same material. On the other hand, the sheet 80 has a transparent portion 81 placed at the upper surface of the lens array 21 for the tachometer A and a transparent portion 82 placed at the upper surface of the lens array 22 for the speedometer B. These transparent portions 81 and 82 are formed as planar sector shapes of 270 degrees, respectively, by a plurality of slits. Each slit of the transparent portions 81 and 82 is formed corresponding to each lens element 20A of the lens arrays 21 and 22. Accordingly, the slits transmit the light that comes from the LEDs of the LED array 11, 12 through the lens elements 20A of the lens array 21, 22, respectively, so that a pointer display operation is possible for each slit. Therefore, in this modification, if one of the lens elements 20A of the lens array 21 and lens array 22 is lit at an angular position corresponding to a variable, it is possible to more clearly provide a display feeling similar to a common meter display which uses a pointer. Here, as in the case of FIG. 5, the variable may be displayed by changing a number or area of the illuminated slits according to a change of a lit area of the lens array 21, 22.

Particularly, the transparent portions 81 and 82 are respectively formed of the slits, and the width of each slit is made narrower than the width of each lens element 20A of the lens array 21, 22. Thus, this modification can more efficiently eliminate blur of the display part due to light effects from external factors as described in the case of FIG. 5.

FIG. 10 shows a cover lens 40 used in this embodiment of LED display device.

The cover lens 40 is disposed on the upper surface of the sheet 30 or sheet 80. The cover lens 40 is formed of a transparent acrylic resin. Though not shown, the cover lens 40 has a protrusion engageable with a hole portion that is formed on a periphery of the housing 50. The cover lens 40 has engraved portions such as characters, marks or the like at its rear surface. Each engraved portion is formed by having the rear surface roughened, coated with a predetermined paint or the like.

Specifically, as shown in FIGS. 1 and 10, the engraved portions for the tachometer A are provided over the transparent portion 31 and composed of engraved portions of numbers "0, 1, 2, - - - , 6" as scales for the tachometer A. Large scale marks 41a correspond to these numbers. Medium scale marks 41b are provided between the large scale marks 41a, and small scale marks 41c are provided between the medium scale marks 41b. The engraved portions for the speedometer B are provided over the transparent portion 32, and are composed of engraved portions of numbers "0, 20, 40, - - - , 160" as scales for the speedometer B. Large scale marks 42a correspond to these numbers. Medium scale marks 42b are provided between the large scale marks 42a, and small scale marks 42c are provided between the medium scales 42b.

The engraved portions for the oil pressure gauge C are provided so as to overlie the transparent portion 33 and composed of scale marks 43a, 43b and 43c, which are located at such angular positions as to divide the transparent portion 33 in two. Characters "H, L" are given to the opposite end scales 43a and 43c. The engraved portions for the fuel gauge D are provided so as to overlie the transparent portion 34 and composed of large scale marks 44a, medium scale marks 44b between the large scale marks and characters "F, E" given to the opposite end large scale marks 44a.

Similarly, the engraved portions for the voltmeter E are provided so as to overlie the transparent portion 35 and composed of large scale marks 45a and 45c, medium scale marks 45b and numbers "0, - - - , 18". The engraved portions for the temperature gauge F are provided so as to overlie the transparent portion 36 and composed of scales 46a and 46b and characters "H, C".

The paint coated on the engraved portions may have different colors according to the kinds of the engraved portions. On the other hand, the paint may have the same color regardless of the different kinds of the engraved portions. Otherwise, it may change its brightness according to the different kinds. Moreover, the paint may differentiate its color or brightness depending on the variable of the meter.

As shown in FIG. 1, in such a cover lens 40, the paint of the engraved portion at the rear surface thereof is colored by the light introduced from the LEDs of the LED array 10A for illumination. The other portions are not colored since they are transparent, so that only the engraved portions can be given desired colors and can be recognized. Various specific examples of the engraved portions will be described later in detail.

In this embodiment of the LED display device, a desired ornamental design can be created by the lens arrays 21–26 and sheets 30, 80, which are illuminated by the LED arrays 11–16, so that the designs thereof can be diversified. The vehicle meter embodying the LED display device can clearly display a predetermined measured amount even if it is located distant from eyes of a driver, contrary to a vehicle meter which displays the measured amount by a well-known mechanical pointer. Thus, it is possible to increase the distance between the eyes of the driver and the vehicle meter while maintaining a clear view of the meter. As a result, it is possible to decrease the extent to which the driver must move his or her line of sight, and if the driver is farsighted, he or she can easily see and recognize the measure amount.

In the cover lens 40 (FIG. 10), only the engraved portions are colored and seen by the light coming from the LED arrays 10A, while the other portions allow the indicators A–F, display portions 1–9, and so on to be seen so that their contents can be recognized. Thus, the cover lens 40 can show the displayed elements overlapped.

Each of the lens arrays 21–26 is arranged in a sector plan shape to from a meter, and introduces light from its outer circumferencem into the lens elements 20A, 20B, so that it is easy to provide a space for disposing the LED arrays 11–16 for mesurement.

The angles of the sector shape of the lens arrays 21–26 are not limited to the above noted values, namely, substantially 90 degrees or 270 degrees. They may be, e.g., substantially 30 degrees or less or 270 degrees or more, depending on the variable to be displayed.

Each of the LED arrays 11–16 can use LEDs that can emit red, green and blue colors or combinations thereof. Namely, the LED arrays 11–16 may use these LEDs to show a desired color and improve the ornamentation. Moreover, the LED arrays 11–16 may be structured so as to change its light color when the variable exceeds a predetermined set value.

Particularly, the LED array 10A may use an LED that has LED chips that are able to emit light in red, green and blue colors, respectively, packed in one element. Otherwise, the LED array 10A may be constructed by arranging a red LED, a green LED and a blue LED in turn. Furthermore, the LED array 10A may be composed of only one of red, green and blue LEDs. In addition, the LED array may be composed of ultraviolet LEDs, while the engraved portions are coated with a paint that is colored by the ultraviolet rays, e.g., fluorescent paint.

While this embodiment of the LED display device is embodied in the vehicle meter panel for displaying measured information for the vehicle, it may be embodied into a specific meter such as a speedometer, tachometer or the like. The manner of displaying thereof is not limited to an analog display or a digital display.

FIGS. 11a–11d show specific examples of scale marks, characters, signs and the like formed on the cover lens 40 of this embodiment of LED display device. In the above illustrative embodiment, the scale mark, character, sign or the like is formed in a form of an engraved portion, which is made by providing a rough surface or paint or the like on the rear (i.e., interior) surface of the cover lens 40. In the following examples, the cover lens 40 has a scale mark, a character, a sign or the like in a form of a hollow or a dent formed in cover lens 40.

Figure 11A:
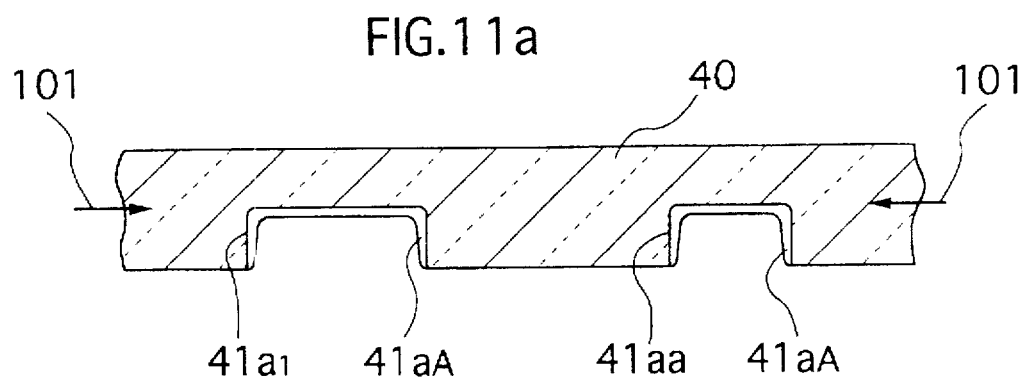
FIG. 11a is a sectional view showing a first example of the engraved portions used for scales, characters and signs given to the cover lens.

In the example of FIG. 11a, the cover lens 40 has scale mark dents 41a1 and character dents 41aa which define the hollows. The scale mark dent 41a1 and the character dent 41aa may be formed at once when molding the cover lens 40 by injection molding. Otherwise, they may be formed by engraving a rear surface of a cover lens blank by a cutting tool after molding the cover lens blank. Transparent or translucent paint coats 41aA are provided on an inner surface of the scale mark dent 41a1 and the character dent 41aa, respectively. LED light 101, which travels inside the cover lens 40 from the LED array 10A for illumination, can clearly show up only the scale mark dent 41a1 and character dent 41aa constructed as above, according to a color of the LED light 101 or a color or a saturation of the paint. With this arrangement, the side surfaces of the scale mark dent 41aa and the character dent 41aa are a little clearer than the plan surface thereof theoretically. However, the user usually sees the plan surface from the front side of the meter panel, so that the user recognizes the light at the scale mark dent 41a1 and the character dent 41aa as uniform light.

In addition, the plan surfaces of the scale mark dent 41a1 and the character dent 41aa are intensively irradiated with the LED light of the LED array 11, which passes through the transparent portion 31 in the thickness direction from the lens array 21.

Namely, light emitted from a specific LED of the LED array 11, that is operated to display a variable, passes through the lens array 21 and the transparent portion 31 and arrives at a corresponding scale mark dent 41a1 and a character dent 41aa. Then, the LED light intensively irradiates the plan surfaces of the scale mark dent 41a1 and the character dent 41aa. Therefore, if the LED light 101 from the LED array 10A and the LED light from the LED array 11 are overlapped around the scale mark dent 41al or the character dent 41aa, the pointer for indicating a variable and a scale mark dent 41a1 and a character dent 41aa can be displayed while clearly distinguished from each other. In the example of FIG. 11a, the transparent or translucent paint coat 41aA is provided on the dents. On the other hand, if an opaque paint 41aA is used, the LED light from the LED array 11 for illuminating the pointer is shut off at some portions of the pointer by the scale mark dent 41a1 and the character dent 41aa. However, in this case, the pointer can be seen by illumination of the LED light from the LED array 11 at other portion than the scale mark dent 41a1 and the character dent 41aa. Moreover, the scale dent 41a1 and the character dent 41aa can be read directly from the front side of the meter panel.

Accordingly, it minimizes the tiredness of the user's eyes if the scale mark dent 41a1 and the character dent 41aa are provided on the cover lens 40, regardless of the kind of the paint.

Figure 11B:
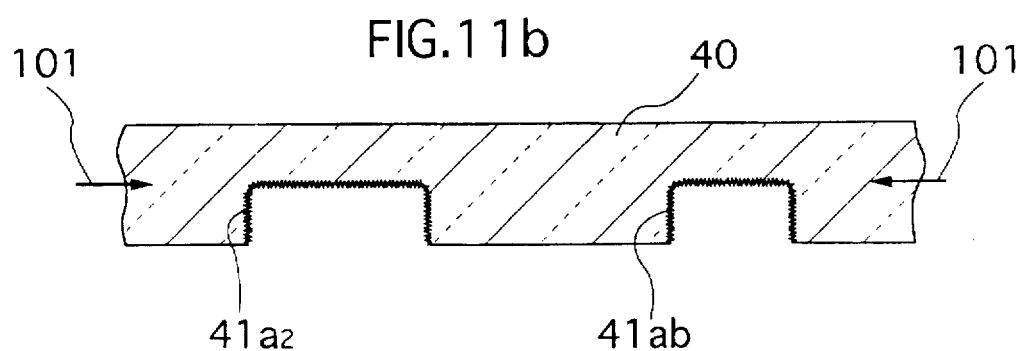
FIG. 11b is a sectional view showing a second example of the engraved portions used for scales, characters and signs given to the cover lens.

In the example of FIG. 11b, the cover lens 40 has scale mark dents 41a2 and character dents 41ab which define the hollows. As in the example of FIG. 11a, The scale mark dent 41a2 and the character dent 41ab may be formed when molding the cover lens 40 by injection molding. Otherwise, they may be formed by engraving a rear surface of a cover lens blank by a cutting tool after molding the cover lens blank. Inner surface of the scale mark dent 41a2 and the character dent 41ab are roughened by graining, respectively. LED light 101, which travels inside the cover lens 40 from the LED array 10A can clearly illuminate only the scale mark dent 41a2 and character dent 41ab constructed as above, according to a color of the LED light. With this structure, the side surfaces of the scale mark dent 41a2 and the character dent 41ab should, theoretically, be a little clearer than the plan surface thereof. However, the user usually sees the plan surface from the front side of the meter panel, so that the user recognizes the light at the scale mark dent 41a2 and the character dent 41ab as uniform light.

In addition, the plan surfaces of the scale mark dent 41a2 and the character dent 41ab are intensively irradiated with the LED light of the LED array 11, which passes through the transparent portion 31 in the thickness direction from the lens array 21.

Namely, light emitted from a specific LED of the LED array 11, that is operated to display a variable, passes through the lens array 21 and the transparent portion 31 and arrives at a corresponding scale mark dent 41a2 and a character dent 41ab. Then, the LED light intensively irradiates the plan surfaces of the scale mark dent 41a2 and the character dent 41ab. Therefore, if the LED light 101 from the LED array 10A and the LED light from the LED array 11 are overlapped around the scale mark dent 41a2 or the character dent 41ab, the pointer for indicating a variable and a scale mark dent 41a2 and a character dent 41ab can be displayed while clearly distinguished from each other.

In the example of FIG. 11b, no paint is coated on the dent 41a2 nor 41ab, contrary to the example of FIG. 11a. Still, a transparent, translucent or opaque paint may be coated on the roughened inner surface of the dent 41a2, 41ab. In this case, similar function and effects to those of the example of FIG. 11a can be expected. On the other hand, the scale mark dent 41a2 and the character dent 41ab with only a roughened inner surface can have similar function and effects to those of the case in which only a white paint is coated on the inner surface thereof. Moreover, if the inner surface of the dents 41a2, 41ab is roughened and coated with the white paint thereon, the illumination color of the dent 41a2, 41ab is determined by the color of light emitted from the LED array 10A introduced inside the cover lens 40. Thus, in this case, it is possible to control the illumination color of the scale mark dent 41a2 and the character dent 41ab by the LED light color of the LED array 10A. Accordingly, this feature of the invention minimizes the tiredness of the eyes of the user if the scale mark dent 41a2 and the character dent 41ab are provided on the cover lens 40, in either case in which the inner surface of the dents 41a2 and 41ab are roughened or in which the paint is coated thereon in addition to the roughening.

Figure 11C:
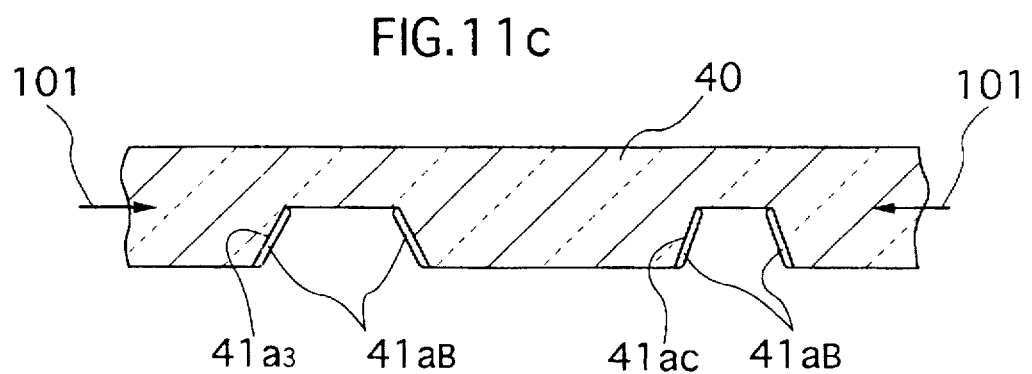
FIG. 11c is a sectional view showing a third example of the engraved portions used for scales, characters and signs given to the cover lens.

In the example of FIG. 11c, the cover lens 40 has scale mark dents 41a3 and character dents 41ac which define hollows in cover lens 40 having a trapezoidal cross section. The scale mark dent 41a3 and the character dent 41ac may be formed when molding the cover lens 40 by injection molding. Otherwise, they may be formed by engraving a rear surface of a cover lens blank by a cutting tool after molding the cover lens blank. Transparent or translucent paint coats 41aB are provided on only an inclined surface of an inner surface of the scale mark dent 41a3 and the character dent 41ac, respectively. A plan surface thereof is made a flat smooth surface. LED light 101, which travels inside the cover lens 40 from the LED array 10A for illumination, can clearly show up only the inclined surfaces of the scale mark dent 41a3 and character dent 41ac constructed as above, according to a color of the LED light 101 or a color or a saturation of the paint.

In addition, the plan surfaces of the scale mark dent 41a3 and the character dent 41ac are intensively irradiated with the LED light of the LED array 11, which passes through the transparent portion 31 in the thickness direction from the lens array 21.

Namely, light emitted from a specific LED of the LED array 11 that is operated to display a variable, passes through the lens array 21 and the transparent portion 31 and arrives at a corresponding scale mark dent 41a3 and a character dent 41ac. Then, the LED light intensively irradiates the plan surfaces of the scale mark dent 41a3 and the character dent 41ac. Therefore, if the LED light 101 from the LED array 10A and the LED light from the LED array 11 are overlapped around the scale mark dent 41a3 or the character dent 41ac, the pointer for indicating a variable and a scale mark dent 41a3 and a character dent 41ac can be displayed while clearly distinguished from each other.

In the example of FIG. 11c, the transparent or translucent paint coat 41aB is provided on the inclined surfaces of the dents. On the other hand, if an opaque paint 41aB is used therefor, the LED light from the LED array 11 for illuminating the pointer is shut off at some portions of the pointer by the inclined surfaces of the scale mark dent 41a3 and the character dent 41ac. However, in this case, the pointer can be seen by illumination of the LED light from the LED array 11 at other portion than the inclined surfaces of the scale mark dent 41a3 and the character dent 41ac. Moreover, the scale dent 41a3 and the character dent 41ac can be read directly from the front side of the meter panel.

Accordingly, this arrangement minimizes the tiredness of the eyes of the user if the scale mark dent 41a3 and the character dent 41ac are provided on the cover lens 40, regardless of the kind of the paint.

Figure 11D:
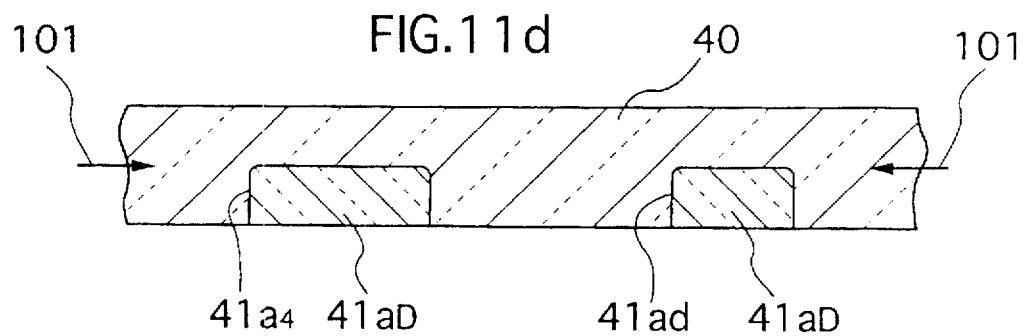
FIG. 11d is a sectional view showing a fourth example of the engraved portions used for scales, characters and signs given to the cover lens.

In the example of FIG. 11d, the cover lens 40 has scale mark dents 41a4 and character dents 41ad which define hollows. The scale mark dent 41a4 and the character dent 41ad may be formed when molding the cover lens 40 by injection molding. Otherwise, they may be formed by engraving a rear surface of a cover lens blank by a cutting tool after molding the cover lens blank. Transparent or translucent synthetic resin materials 41aD are embedded into the scale mark dent 41a4 and the character dent 41ad, respectively. LED light 101, which travels inside the cover lens 40 from the LED array 10A for illumination, clearly illuminate only the scale mark dent 41a4 and character dent 41ad constructed as above, according to a color of the LED light 101 or a color or a saturation of the synthetic resin material 41aD. Here, the cover lens 40 and the synthetic resin material 40aD may be formed integrally at the same time.

In addition, the lower exposed surfaces of the synthetic resin materials 40ad in the scale mark dent 41a4 and the character dent 40ad are intensively irradiated with the LED light of the LED array 11, which passes through the transparent portion 31 in the thickness direction from the lens array 21.

Namely, light emitted from a specific LED of the LED array 11 that is operated to display a variable, passes through the lens array 21 and the transparent portion 31 and arrives at a corresponding scale mark dent 41a4 and a character dent 41ad. Then, the LED light intensively irradiates the lower exposed surfaces of the scale mark dent 41a4 and the character dent 41ad. Therefore, if the LED light 101 from the LED array 10A and the LED light from the LED array 11 are overlapped around the scale mark dent 41a4 or the character dent 41ad, the pointer for indicating a variable and a scale mark dent 41a4 and a character dent 41ad can be displayed while clearly distinguished from each other.

In the example of FIG. 11d, the transparent or translucent synthetic resin material 41aD is embedded in the dents. On the other hand, if an opaque synthetic resin material 41aD is used, the LED light from the LED array 11 for illuminating the pointer is shut off at some portions of the pointer by the scale mark dent 41a4 and the character dent 41ad. However, in this case, the pointer can be seen by illumination of the LED light from the LED array 11 at other portion than the scale mark dent 41a4 and the character dent 41ad. Moreover, the scale dent 41a4 and the character dent 41ad can be read directly from the front side of the meter panel.

Accordingly, this arrangement minimizes the tiredness of the eyes of the user if the scale mark dent 41a4 and the character dent 41*ad* are provided on the cover lens 40, regardless of the kind of the synthetic resin material.

Of course, the examples shown in FIGS. 11*a*–11*d* can be used in combination appropriately. Moreover, the light color of the LED array 10A may be one or more of red, green and blue. In this case, a desired light control is possible such that only specific scale marks and characters are displayed or so that they are displayed with different colors. The display features discussed above can be provided to scale marks representing a value of a variable, a unit of a scale, characters showing other matters, and any other marks.

While each of the examples of FIGS. 11*a*–11*d* are described with respect to the LED array 11 for the tachometer A, they can be applied to the LED arrays 12–16 for the other meters.

In the examples of FIGS. 11*a*–11*d*, the LED array may be composed of ultraviolet LEDs while the paint or synthetic resin material provided on the dents of the cover lens 40 may be one which emits light in response to the ultraviolet rays.

Generally, in the above embodiment of an LED display device, light from a specific LED of the LED array 11–16 for a meter passes through the lens array 21–26 and the transparent portion 31–36 or 81–86, and arrives at the scale mark dent 41*a*1, 41*a*2, 41*a*3, 41*a*4 and the character dent 41*aa*, 41*ab*, 41*ac*, 41*ad*. At this time, LED light from the LED array 10A for illumination irradiates the plan surface of the scale mark dent 41*a*1, 41*a*2, 41*a*3, 41*a*4 and the character dent 41*aa*, 41*ab*, 41*ac*, 41*ad*. Here, it is possible that, when the characters or the like of the dents are three-dimensionally shown, the LED light 101 for displaying the scale mark dent 41*a*1, 41*a*2, 41*a*3, 41*a*4 and the character dent 41*aa*, 41*ab*, 41*ac*, 41*ad* is overlapped or mixed with the LED light from the LED array 11–16 for meters for indicating a variable. Still, it is possible to clearly display the scale mark dent 41*a*1, 41*a*2, 41*a*3, 41*a*4 and the character dent 41*aa*, 41*ab*, 41*ac*, 41*ad*, while distinguishing them from the pointer which is being indicated. Moreover, if an opaque paint is used for the dents, the light from the LED array 11–16, which lights up the pointer currently indicated, is partially shut off at the scale mark dent 41*a*1, 41*a*2, 41*a*3, 41*a*4 and the character dent 41*aa*, 41*ab*, 41*ac*, 41*ad*. However, as mentioned above, it is possible to directly read not only the scale mark dent 41*a*1, 41*a*2, 41*a*3, 41*a*4 and the character dent 41*aa*, 41*ab*, 41*ac*, 41*ad* but also the pointer illuminated by the LED light from the LED array 11–16 for indicating a variable. Thus, in any case of the above (coating paint on the dent, graining it, embedding synthetic resin material therein), if the scale mark dent 41*a*1, 41*a*2, 41*a*3, 41*a*4 and the character dent 41*aa*, 41*ab*, 41*ac*, 41*ad* are provided on the cover lens 40, the tiredness of the user can be minimized.

While this embodiment provides a sheet 30, 80 to make the entire meter panel more expressive and prevent leakage of the LED light and blur caused thereby, the sheet 30, 80 may be omitted. In this case, similar function and effects can be attained to the above, too.

While this embodiment forms all of the scale marks, characters, signs and the like by forming depressions at the rear surface of the cover lens 40, it is enough to provide at least one of the scale marks, characters and signs by defining a depression at the rear surface of the cover lens 40. If the scale marks or the like are made of the hollows, such scale marks, characters or signs can be made integrally with the cover lens 40 at the time of molding it.

At least one of the scale marks, characters and signs may be formed by coating a paint directly on the cover lens 40 through a printing method or the like. In this case, its manufacturing is simple and the printing technique can be used as it is.

At least one of the scale marks, characters and signs may be formed by simply providing a rough surface on the cover lens 40. In this case, the rough surface can be illuminated according to the color of light introduced in the cover lens 40, so that it is possible to control the illumination color of at least one of the scale marks, characters and sings.

At least one of the scale marks, characters and signs may be provided by forming protruded portions at the rear surface of the cover lens 40. In this case, as in the case of the scale marks formed of the hollows, the protruded portions can be formed integrally on the cover lens 40 when molding it. Moreover, the protruded portion may be coated with a paint or fitted with or embed therein another resin member.

At least one of the scale marks, characters and signs may be provided by forming a hollow or a protrusion, while forming a rough part at a surface of the hollow or protrusion. In this case, the rough surface improves light absorption efficiency at part of the hollow or protrusion and the color intensity can be enlarged at that part.

At least one of the scale marks, characters and signs may be provided by forming a rough surface on the cover lens 40 and coating a paint on the rough surface. In this case, the rough surface improves the light absorption efficiency at the scale marks or the like and the color intensity can be enlarged at that part.

The scale marks, characters and signs of the cover lens 40 may be either light-transmitting or opaque as mentioned above. However, if at least one of them is made light-transmitting, at least one of the scale marks, characters and signs and the pointer indicating a variable can be directly seen by the user through the LED light.

If, however, at least one of the scale marks, characters and signs of the cover lens 40 is made opaque, part of a pointer indicating a value of a variable cannot be seen directly due to the opaque scale mark, character or sign. However, the pointer is shown as a straight line of a fixed length in the radial direction via each lens element 20A, 20B of the lens array 21–26. Therefore, most of the pointer is seen illuminated by the LED light and the user can easily know the value of the variable without seeing other scale mark or unit.

While this embodiment arranges the characters within a area for indicating a variable, only the characters or the scale marks and characters may be provided outside such area. At this time, the scale marks and characters are arranged near the variable indicating area.

In the case of coating a paint or embedding a synthetic resin material in the hollow, if at least one of the scale mark, character and sign is provided on the cover lens 40 in the form of the scale mark dent 41*a*1, 41*a*2, 41*a*3, 41*a*4 and the character dent 41*aa*, 41*ab*, 41*ac* 41*ad*, such scale mark, character or sign can be shown three-dimensionally, since the cover lens 40 is made of a transparent material, regardless of the kind of paint or material. Moreover, it is possible to reduce the tiredness of eyes of the user who views the meters at the side of the cover lens 40. Namely, unique design effects can be obtained and the picture quality improves.

While this embodiment introduces the LED light of the LED array through the lens array 21–26 to display a variable, the variable may be indicated through another display means such as liquid crystal or the like.

In case of fitting a synthetic resin in the hollow or the scale mark dent 41*a*1, 41*a*2, 41*a*3, 41*a*4 and the character dent 41aa, 41ab, 41ac, 41ad, the cover lens 40 and the synthetic resin can be made into one body, and prolonging their life by selecting the same material for each. Moreover, since their refraction indexes can be set in any values, it is possible to set the display in any color and give it any three-dimensional appearance.

Figure 12:
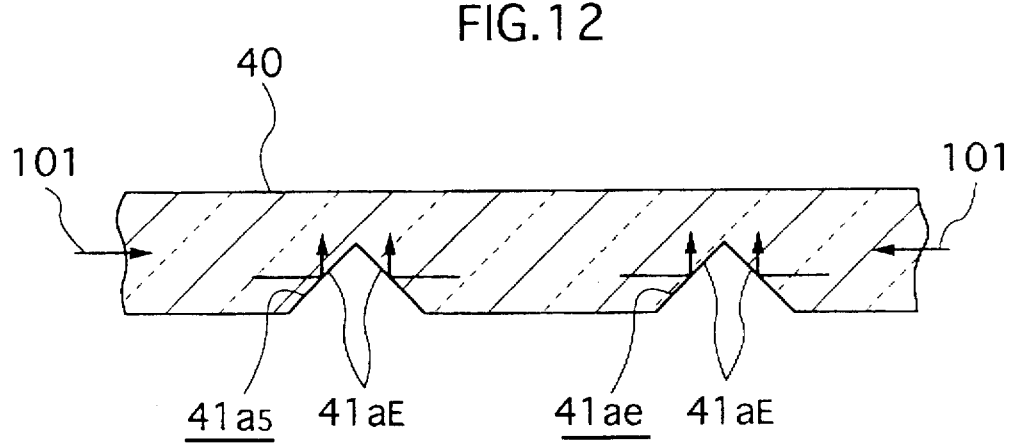
FIG. 12 is a sectional view showing a fifth example of the engraved portions used for scales, characters and signs given to the cover lens.
Figure 13:
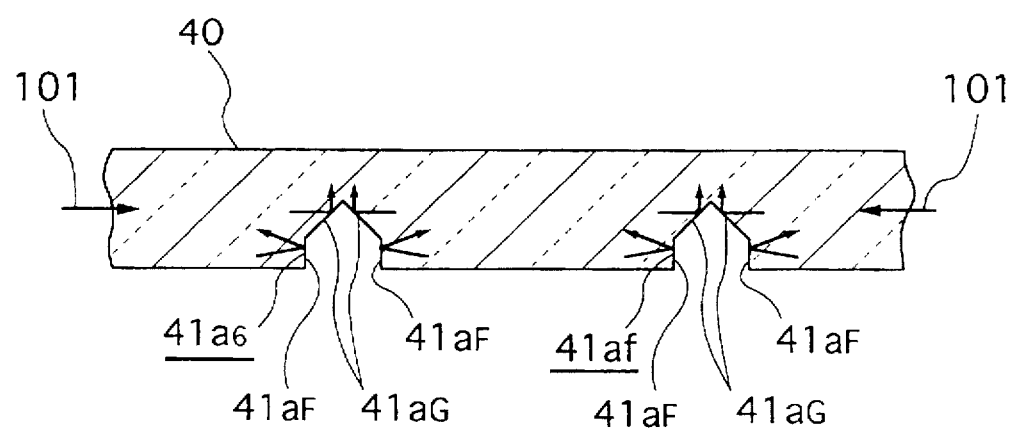
FIG. 13 is a sectional view showing a sixth example of the engraved portions used for scales, characters and signs given to the cover lens.

While the above embodiment provides the scale mark dents 41a1, 41a2, 41a3, 41a4 and the character dent 41aa, 41ab, 41ac, 41ad shown in FIGS. 11a–11d on the cover lens 40, scale mark dents and character dents shown in FIG. 12 or FIG. 13 may be provided instead thereof or in addition thereto.

Namely, each of the examples shown in FIG. 11a–11d diffuses the LED light in the planar direction (right and left direction in FIG. 11a–11d) of the cover lens 40 to make the scale mark 41aa and the like seen by the user, the example shown in FIG. 12 or FIG. 13 reflects the LED light in the planar direction (right and left direction in FIG. 12 or FIG. 13) of the cover lens 40 to make the scale mark 41a and the like seen by the user. Specifically, a modification shown in FIG. 12 provides the cover lens 40 with a scale mark dent 41a5 and a character dent 41ae of a triangular cross section. Each of the scale mark dent 41a5 and the character dent 41ae is composed of a pair of reflecting surfaces 41aE crossing at an angle of substantially 90 degrees. Each reflecting surface 41aE is a flat and smooth gloss surface and slants at an angle of substantially 135 degrees with respect to a planar direction (right and left direction of FIG. 12) of the cover lens 40. Each of the scale mark dent 41a5 and the character dent 41ae is formed such that a peak between the reflecting surfaces 41aE comes to nearly a middle position in the thickness direction of the cover lens 40. As in the above embodiment, the scale mark dent 41a5 and the character dent 41ae may be formed at the time of molding the cover lens 40 by injection or formed by engraving through a cutting tool after molding the cover lens 40.

Thus constructed scale mark dent 41a5 and character dent 41ae reflect the LED light 101 travelling within the cover lens 40 from the LED array 10A at the reflecting surfaces 41aE, conducts it to the front surface of the cover lens 40 and radiates it outside. Therefore, in the same manner as the case of FIGS. 11a–11d, only the scale mark dent 41a5 and character dent 41ae can be clearly shown according to a kind of the LED light travelling the inside of the cover lens 40, namely, the color of the LED light.

The LED light from the LED array 11 for the tachometer A passes the lens array 21 and the transparent portion 31, thereafter going through the cover lens 40 via the scale mark dents 41a5 and character dents 41ae, too.

Accordingly, light emitted from a specific LED of the LED array 11 passes through the lens array 21 and the transparent portion 31 and arrives at a corresponding scale mark dent 41a5 and a character dent 41ae. Then, the LED light goes through the scale mark dent 41a5 and the character dent 41a3 and radiated outside. Therefore, if the LED light 101 from the LED array 10A and the LED light from the LED array 11 are overlapped around the scale mark dent 41a5 or the character dent 41ae, the pointer for indicating a variable and a scale mark dent 41a5 and a character dent 41ae can be displayed while clearly distinguished from each other.

Thus, the above arrangement minimizes the tiredness of the eyes of the user if the scale mark dent 41a5 and the character dent 41ae are provided on the cover lens 40.

Namely, the modification of FIG. 12 reflects the LED light 101 from the LED array 10A, which travels in the planar direction, at an angle of substantially 90 degrees via the reflecting surfaces 41aE and radiates it to the front surface side of the cover lens 40. Thus, the scale mark dents 41a5 and the character dents 41ae can be clearly seen.

A modification shown in FIG. 13 provides the cover lens 40 with a scale mark dent 41a6 and a character dent 41af having a pentagonal cross section. Each of the scale mark dent 41a6 and the character dent 41af is composed of a pair of first reflecting surfaces 41aF and a pair of second reflecting surfaces 41aG. The first reflecting surfaces 41aF are parallel and extend upward so as to cross at right angles with the planar direction (right and left direction of FIG. 13) of the cover lens 40. The second reflecting surfaces 41aG extend successively to the first reflecting surfaces 41aF and cross at an angle of substantially 90 degrees to define a triangular cross section. Each of the first and second reflecting surfaces 41aF and 41aG is a flat and smooth gloss surface, and the second reflecting surface 41aG slants at an angle of substantially 135 degrees with respect to the planar direction (right and left direction of FIG. 13) of the cover lens 40. Each of the scale mark dent 41a6 and the character dent 41af is formed such that a peak between the second reflecting surfaces 41aG is nearly at a middle position in the thickness direction of the cover lens 40. As in the above embodiment of FIGS. 11a–11d, the scale mark dent 41a6 and the character dent 41af may be formed at the time of molding the cover lens 40 by injection or formed by engraving through a cutting tool after molding the cover lens 40.

The thus constructed scale mark dent 41a6 and character dent 41af reflect the LED light 101 travelling inside of the cover lens 40 from the LED array 10A mainly at the second reflecting surfaces 41aG, conducts it to the front surface of the cover lens 40 and radiates it outside. Therefore, in the same manner as the case of FIG. 11a–11d, only the scale mark dent 41a6 and character dent 41af can be clearly shown according to a kind of the LED light travelling inside of the cover lens 40, namely, the color of the LED light. At this time, because the second reflecting surfaces 41aG are located near the middle position in the thickness direction of the cover lens 40, the LED light reflected on the second reflecting surfaces 41aG gives a viewer the feeling that the scale mark dent 41a6 and character dent 41af are floating around the middle position in the thickness direction of the cover lens 40.

On the other hand, light inclined to the planar direction of the cover lens 40 among the LED light travelling inside the cover lens 40 is reflected on the first reflecting surfaces 41aF, conducted thereby to a direction crossing the thickness direction of the cover lens 40 to a large degree and radiated outside. Therefore, though a line of sight of the user is usually in a direction generally perpendicular to the cover lens 40, if it is changed to a direction inclined to the cover lens 40, the scale mark dent 41a6 and character dent 41af can be seen through the LED light reflected on the first reflecting surfaces 41aF. Moreover, the LED light exiting from the cover lens 40 is diffused by the first reflecting surfaces 41aF, so that the scale mark dent 41a6 and character dent 41af can be displayed as a three-dimensional image and appear to have depth.

The LED light from the LED array 11 for the tachometer A passes through the lens array 21 and the transparent portion 31, thereafter going through the cover lens 40 via the scale mark dents 41a6 and character dents 41af, too.

Accordingly, light emitted from a specific LED of the LED array 11 passes through the lens array 21 and the transparent portion 31 and arrives at a corresponding scale mark dent 41a6 and a character dent 41af. Then, the LED light goes through the scale mark dent 41a6 and the character dent 41af and is radiated outside the device. Therefore, if the LED light 101 from the LED array 10A and the LED light from the LED array 11 are overlapped around the scale mark dent 41a6 or the character dent 41af, the pointer for indicating a variable and a scale mark dent 41a6 and a character dent 41af can be displayed while clearly distinguished from each other.

Thus, this arrangement minimizes the tiredness of the eyes of the user if the scale mark dent 41a6 and the character dent 41af are provided on the cover lens 40, as in the case of FIGS. 11a–11d.

Namely, the modification of FIG. 13 reflects the LED light from the LED array 10A, which travels in the planar direction, at an angle of substantially 90 degrees via the second reflecting surfaces 41aG and radiates it to the front surface side of the cover lens 40. Thus, the scale mark dents 41a6 and the character dents 41af can be clearly seen. Moreover, the first reflecting surfaces 41aF diffuse the LED light into the cover lens 40, thereby giving a deep feeling to the display of the scale mark dent 41a6 and character dent 41af. As a result, the display of the scale mark dent 41a6 and character dent 41af can be three-dimensional.

While the modifications of FIGS. 12 and 13 make the reflecting surface 41aE, 41aF, 41aG a gloss surface, it may be coated with a white paint or the like as in the case of FIG. 11a, or roughened by graining or plated with metal as in the case of FIG. 11b. In these cases, in addition to the above effects, it is possible to diffuse the LED light, thereby diversifying the design or increasing the luminance of the scale mark dent 41a6 and character dent 41af to brighten them.

Moreover, in each of the examples of FIGS. 11a–11d or the modification of FIG. 12 or FIG. 13, a fluorescent paint may be coated on the inner surface of the scale mark dent 41a1, 41a3, 41a5, 41a6 and character dent 41aa, 41ac, 41ae, 41af or the reflecting surface 41aE, 41aF, 41aG, so as to illuminate the fluorescent paint by light of a wavelength in the ultraviolet zone contained in the LED light from the blue LED. Thus, the scale marks 41a or the like can be illuminated in a fluorescent color by effectively using the blue LED of the LED array 10A without adding any special light source, e.g. a fluorescent lamp, for lighting the fluorescent paint.

The preferred embodiments described herein are therefor illustrative and not restrictive. The scope of the invention is intended to extend to variations including equivalent structures, means, and uses, within the meaning of the appended claims.

What is claimed is:

1. A display device having a front side, a rear side and a display area, comprising:

a printed circuit board;

a first LED array including a plurality of LEDs disposed on said printed circuit board at a position corresponding to said display area;

a lens array including a plurality of lens elements, each of said lens elements having an incident surface facing at least one of said plurality of LEDs in said first LED array and a radiant surface diffusing incident light entering said incident surface so as to radiate said light toward said front side of said display device;

a cover lens disposed on said lens array at said front side of said display device, said cover lens having an end; and a second LED array including a plurality of LEDs disposed on said printed circuit board such that said second LED array radiates light into said end of said cover lens;

said cover lens transmitting incident light from said plurality of LEDs of said second LED array from said end of said cover lens generally toward said lens array at said front side of said display device.

2. A display device according to claim 1, further comprising:

a sheet disposed on said lens array at said front side of said display device, said sheet selectively blocking light emitted from said lens array from exiting said display device;

said cover lens being disposed on said sheet on a side thereof facing said front side of said display device, and transmitting light exiting from said lens array.

3. A display device according to claim 1, wherein at least one of said plurality of LEDs in one of said first and said second LED arrays is composed of at least one of a red LED, a green LED and a blue LED.

4. A display device according to claim 1, wherein said cover lens is a planar member having an outer circumferential edge, and has at least one of a scale mark, a character and a sign provided thereon;

wherein said plurality of LEDs in said second LED array are disposed on said printed circuit board at such a position as to radiate light into said outer circumferential edge of said cover lens; and wherein said cover lens transmits incident light from said plurality of LEDs of said second LED array from said outer circumferential edge generally forward said lens array at said front side of said display device.

5. A display device according to claim 4, further comprising:

a sheet disposed on said lens array at said front side of said display device, said sheet selectively blocking light emitted from said lens array from exiting said display device;

said cover lens being disposed on said sheet on a side thereof facing said front side of said display device, and transmitting light exiting from said lens array passing said sheet.

6. A display device according to claim 4, wherein at least one of said scale mark, character and sign comprises a coating of paint provided directly on said cover lens.

7. A display device according to claim 4, wherein at least one of said scale mark, character and sign comprises a rough surface provided on said cover lens.

8. A display device according to claim 4, wherein at least one of said scale mark, character and sign comprises a hollow defined on a rear surface, facing said rear side of said display device, of said cover lens.

9. A display device according to claim 4, wherein at least one of said scale mark, character and sign comprises a protrusion provided on a rear surface, facing said rear side of said display device, of said cover lens.

10. A display device according to claim 4, wherein at least one of said scale mark, character and sign comprises one of a hollow and a protrusion defined on a rear surface, facing said rear side of said display device, of said cover lens, wherein a rough surface is provided on a part of said one of said cover lens defining said hollow and said protrusion.

11. A display device according to claim 7, wherein said one of a portion of said cover lens defining said hollow and a portion of said protrusion has a paint coated on said rough surface.

12. A display device according to claim 4, wherein at least one of said scale mark, character and sign is light-transmitting.

13. A display device according to claim 4, wherein at least one of said scale mark, character and sign is opaque.

14. A display device according to claim 4, wherein one of said first and said second LED arrays emits light of at least one of a red, a green and a blue color.

15. A display device having a front side and a rear side, comprising:

a printed circuit board;

an illuminating LED array including a plurality of LEDs disposed on said printed circuit board; and a cover lens of a transparent material having an end facing said illuminating LED array, a front surface facing said front side of said display device and a rear surface facing said rear side of said display device, said cover lens transmitting light of said illuminating LED array from the end; and said cover lens having at least one of a scale mark, a character and a sign defined by a hollow located at said rear surface of said cover lens such that at least one of said scale mark, character and sign is displayed by said illuminating LED array.

16. A display device according to claim 15, further comprising:

a meter LED array including a plurality of LEDs disposed on said printed circuit board; and a lens array including a plurality of lens elements, each of said lens elements having an incident surface facing at least one of said plurality of LEDs in said meter LED array and a radiant surface diffusing incident light entering said incident surface so as to radiate said light toward said front side of said display device;

and wherein said cover lens has a plate shape having an outer circumferential edge;

said plurality of LEDs in said illuminating LED array being disposed on said printed circuit board at such a position as to radiate light into said outer circumferential edge of said cover lens; and said cover lens transmits incident light from said plurality of LEDs in said illuminating LED array from said outer circumferential edge generally toward said lens array at said front side of said display device.

17. A display device according to claim 15, further comprising:

a meter LED array including a plurality of LEDs disposed on said printed circuit board;

a lens array including a plurality of lens elements, each of said lens elements having an incident surface facing at least one of said plurality of LEDs in said meter LED array and a radiant surface diffusing incident light entering said incident surface so as to radiate said light toward said front side of said display device; and a sheet disposed on said lens array at said front side of said display device, said sheet selectively blocking light emitted from said lens array from exiting said display device;

said cover lens being disposed on said sheet at a side thereof facing said front side of said LED display device, and transmitting light exiting from said lens array passing said sheet.

18. An LED display device according to claim 15, wherein said cover lens has a light-transmitting paint coated on a portion thereof defining said hollow.

19. A display device according to claim 15, wherein said cover lens has an opaque paint coated on a portion thereof defining said hollow.

20. A display device according to claim 15, wherein said cover lens has a synthetic resin fitted inside said hollow.

21. A display device according to claim 15, wherein one of said first and second LED arrays emit light of at least one of a red, a green and a blue color.

22. A display device according to claim 15, wherein said hollow of said cover lens has a triangular cross section composed of a pair of reflecting surfaces crossing at a fixed angle, each reflecting surface being inclined with respect to a planar direction of said cover lens.

23. An LED display device according to claim 15, wherein said hollow of said cover lens has a pentagonal cross section composed of a pair of first reflecting surfaces extending substantially in a thickness direction of said cover lens and a a pair of second reflecting surfaces formed adjacent to said first reflecting surfaces and crossing at a fixed angle, each second reflecting surface being inclined with respect to a planar direction of said cover lens.

* * * * *